United States Patent
Yang et al.

(10) Patent No.: US 11,454,540 B2
(45) Date of Patent: Sep. 27, 2022

(54) WEARABLE SPECTROSCOPY USING FILTERED SENSOR

(71) Applicant: BioSpex, Inc., San Jose, CA (US)

(72) Inventors: Wei Yang, Los Altos Hills, CA (US); Changqing Wang, Livermore, CA (US); Ming Chai, Union City, CA (US); Shu Zhang, Fremont, CA (US)

(73) Assignee: BioSpex, Inc., San Jose, CA (US)

( * ) Notice: Subject to any disclaimer, the term of this patent is extended or adjusted under 35 U.S.C. 154(b) by 0 days.

(21) Appl. No.: 16/510,789

(22) Filed: Jul. 12, 2019

(65) Prior Publication Data

US 2021/0010865 A1    Jan. 14, 2021

(51) Int. Cl.
*G01J 3/44* (2006.01)
*G01N 21/25* (2006.01)
*G01J 3/28* (2006.01)

(52) U.S. Cl.
CPC ............... *G01J 3/44* (2013.01); *G01J 3/2803* (2013.01); *G01N 21/255* (2013.01); *G01J 2003/2806* (2013.01); *G01N 2201/0612* (2013.01)

(58) Field of Classification Search
CPC .... G01J 3/44; G01J 3/2803; G01J 2003/2806; G01J 2003/4424; G01N 21/255;
(Continued)

(56) References Cited

U.S. PATENT DOCUMENTS

| 4,722,604 A | 2/1988 | French et al. |
| 4,988,190 A | 1/1991 | Miles |

(Continued)

FOREIGN PATENT DOCUMENTS

| AT | 1103 U1 | 10/1996 |
| CN | 107505306 A | 12/2017 |

(Continued)

OTHER PUBLICATIONS

Kostamovaara, J. et al., "Fluorescence suppression in Raman spectroscopy using a time-gated CMOS SPAD," Optics Express, Optics Society of America, vol. 21, No. 25, Dec. 13, 2013, 14 pages.

(Continued)

*Primary Examiner* — Mohamed K Amara
(74) *Attorney, Agent, or Firm* — Carr & Ferrell LLP

(57) ABSTRACT

Methods and systems for spectroscopy are provided. Exemplary methods include: illuminating, with a tunable laser, an analyte with first light; detecting, with a filtered sensor, a first Raman signal; illuminating, with the tunable laser, the analyte using second light; detecting, with the filtered sensor, a second Raman signal, the second Raman signal being shifted from the first Raman signal by a second predetermined increment; illuminating, with the tunable laser, the analyte using third light; detecting, with the filtered sensor, a third Raman signal, the third Raman signal being shifted from the second Raman signal by the second predetermined increment; constructing a Raman spectrum using the first Raman signal, the second Raman signal, and the third Raman signal; and determining at least one molecule of the analyte using the Raman spectrum and a database of predetermined Raman spectra.

20 Claims, 13 Drawing Sheets

(58) Field of Classification Search
CPC ........... G01N 2201/0612; G01N 21/65; G01N 21/658; G01N 2021/656; G01N 2021/6419; G01N 2021/655; G01N 21/39; A61B 5/14532; A61B 5/0075
See application file for complete search history.

(56) References Cited

U.S. PATENT DOCUMENTS

| | | | |
|---|---|---|---|
| 5,011,284 A * | 4/1991 | Tedesco | G01J 3/02 356/301 |
| 5,257,085 A * | 10/1993 | Ulich | G01J 3/2823 348/31 |
| 5,615,673 A | 4/1997 | Berger et al. | |
| 5,628,310 A | 5/1997 | Rao et al. | |
| 5,811,804 A * | 9/1998 | Van Blitterswijk | G01N 21/65 250/310 |
| 5,991,653 A | 11/1999 | Richards-Kortum et al. | |
| 6,011,984 A | 1/2000 | Van Antwerp et al. | |
| 6,366,793 B1 | 4/2002 | Bell et al. | |
| 6,631,282 B2 | 10/2003 | Rule et al. | |
| 6,665,556 B1 | 12/2003 | Alfano et al. | |
| 6,763,047 B2 * | 7/2004 | Daiber | H01S 5/141 372/34 |
| 6,766,183 B2 | 7/2004 | Walsh et al. | |
| 6,853,452 B1 | 2/2005 | Laufer | |
| 7,102,746 B2 * | 9/2006 | Zhao | G01J 3/44 356/301 |
| 7,647,092 B2 | 1/2010 | Motz et al. | |
| 8,072,595 B1 | 12/2011 | Bastiaans et al. | |
| 8,325,337 B2 | 12/2012 | Sinfield et al. | |
| 8,570,507 B1 | 10/2013 | Cooper et al. | |
| 8,873,041 B1 * | 10/2014 | Chai | G01J 3/44 356/301 |
| 9,462,255 B1 | 10/2016 | Marason et al. | |
| 9,494,466 B2 | 11/2016 | Uchii et al. | |
| 9,554,738 B1 | 1/2017 | Gulati et al. | |
| 10,253,346 B2 * | 4/2019 | Auner | G01J 3/4406 |
| 10,317,281 B2 * | 6/2019 | Wang | G01J 3/021 |
| 10,405,785 B2 * | 9/2019 | Ho | A61B 5/7225 |
| 10,408,760 B2 * | 9/2019 | Wang | G01J 3/44 |
| 10,416,081 B2 * | 9/2019 | Sumpf | G01N 15/1459 |
| 10,548,481 B2 | 2/2020 | Yang et al. | |
| 10,760,969 B1 * | 9/2020 | Wang | G01J 3/4412 |
| 10,794,766 B2 * | 10/2020 | Sumpf | G01J 3/28 |
| 10,876,892 B2 | 12/2020 | Yang et al. | |
| 10,881,301 B2 | 1/2021 | Periaki et al. | |
| 10,987,036 B2 * | 4/2021 | Ray | A61B 5/02411 |
| 11,035,797 B2 | 6/2021 | Yang et al. | |
| 11,320,588 B1 * | 5/2022 | Mazed | G01S 17/34 |
| 11,326,944 B2 | 5/2022 | Yang et al. | |
| 2003/0059820 A1 | 3/2003 | Vo-Dinh | |
| 2003/0234932 A1 | 12/2003 | Nicolaides et al. | |
| 2004/0180379 A1 | 9/2004 | Van Duyne et al. | |
| 2004/0223881 A1 | 11/2004 | Cunningham et al. | |
| 2005/0027176 A1 * | 2/2005 | Xie | A61B 5/411 600/316 |
| 2005/0043597 A1 | 2/2005 | Xie | |
| 2005/0057749 A1 * | 3/2005 | Dietz | G01N 15/1475 356/318 |
| 2006/0114312 A1 | 6/2006 | Shiraishi | |
| 2007/0004975 A1 | 1/2007 | Zribi et al. | |
| 2007/0165236 A1 * | 7/2007 | Haridas | G01J 3/10 356/451 |
| 2007/0195320 A1 * | 8/2007 | Sriram | G01J 3/26 356/301 |
| 2007/0252978 A1 | 11/2007 | Van Der Voort et al. | |
| 2008/0030726 A1 * | 2/2008 | Flanders | G01N 21/65 356/301 |
| 2008/0030728 A1 * | 2/2008 | Nguyen | G01J 3/0262 356/328 |
| 2008/0091064 A1 | 4/2008 | Laser | |
| 2008/0129992 A1 | 6/2008 | Matousek et al. | |
| 2008/0198365 A1 | 8/2008 | Treado et al. | |
| 2008/0214913 A1 * | 9/2008 | Van Gogh | A61B 5/14532 600/318 |
| 2009/0046289 A1 | 2/2009 | Caldwell et al. | |
| 2009/0105605 A1 | 4/2009 | Abreu | |
| 2010/0020312 A1 * | 1/2010 | Jeong | G01J 3/0291 356/73 |
| 2011/0122407 A1 | 5/2011 | Jalali et al. | |
| 2011/0275932 A1 | 11/2011 | Leblond et al. | |
| 2012/0026483 A1 | 2/2012 | Messerchmidt | |
| 2012/0035442 A1 | 2/2012 | Barman et al. | |
| 2012/0099102 A1 * | 4/2012 | Bello | G01J 3/2803 356/301 |
| 2012/0203114 A1 * | 8/2012 | Bechtel | A61B 5/0075 600/476 |
| 2012/0231447 A1 * | 9/2012 | Zhang | G01N 21/6428 435/6.1 |
| 2012/0287428 A1 | 11/2012 | Tamada | |
| 2012/0309080 A1 * | 12/2012 | Cunningham | G01N 21/658 435/288.7 |
| 2013/0018237 A1 | 1/2013 | Henneberg et al. | |
| 2013/0147766 A1 | 6/2013 | Chen et al. | |
| 2013/0342835 A1 | 12/2013 | Blacksberg | |
| 2014/0268050 A1 | 9/2014 | Jayaraman | |
| 2015/0233836 A1 | 8/2015 | Okumura et al. | |
| 2015/0342508 A1 | 12/2015 | Chong | |
| 2016/0061660 A1 | 3/2016 | Kim | |
| 2016/0293858 A1 * | 10/2016 | Brandt | H01L 51/0047 |
| 2016/0354015 A1 | 12/2016 | Zhang et al. | |
| 2017/0059412 A1 * | 3/2017 | Ye | G01J 3/0256 |
| 2017/0062636 A1 * | 3/2017 | Ram | H01L 27/1443 |
| 2017/0074732 A1 | 3/2017 | Marsh et al. | |
| 2017/0108439 A1 * | 4/2017 | Stievater | G02B 6/124 |
| 2017/0112380 A1 * | 4/2017 | Jeong | A61B 1/00009 |
| 2017/0173262 A1 | 6/2017 | Veltz | |
| 2018/0042527 A1 | 2/2018 | Rawicz et al. | |
| 2018/0164218 A1 | 6/2018 | Zavaleta et al. | |
| 2018/0299355 A1 | 10/2018 | Young et al. | |
| 2018/0310827 A1 | 11/2018 | Yang et al. | |
| 2018/0313692 A1 | 11/2018 | Yang et al. | |
| 2019/0015023 A1 | 1/2019 | Monfre | |
| 2019/0128934 A1 | 5/2019 | Park et al. | |
| 2019/0154584 A1 | 5/2019 | Ahn et al. | |
| 2019/0195688 A1 * | 6/2019 | Atabaki | G01J 1/4257 |
| 2019/0274759 A1 | 9/2019 | Royon | |
| 2019/0336057 A1 * | 11/2019 | Alford | A61B 5/4064 |
| 2019/0339356 A1 * | 11/2019 | Schildknecht | G01S 7/493 |
| 2019/0370447 A1 | 12/2019 | Houck et al. | |
| 2019/0383782 A1 * | 12/2019 | Steiner | A01K 43/00 |
| 2020/0056997 A1 * | 2/2020 | Furusho | G01N 21/658 |
| 2020/0124535 A1 | 4/2020 | Yang et al. | |
| 2020/0237272 A1 * | 7/2020 | Lin | G02B 26/12 |
| 2020/0278255 A1 | 9/2020 | Wang et al. | |
| 2020/0320708 A1 * | 10/2020 | Ma | G06T 7/66 |
| 2020/0352444 A1 | 11/2020 | Periaki et al. | |
| 2020/0393299 A1 | 12/2020 | Wang et al. | |
| 2021/0003450 A1 * | 1/2021 | Hunter | G01J 3/189 |
| 2021/0010861 A1 | 1/2021 | Yang et al. | |
| 2021/0048342 A1 * | 2/2021 | Kim | G01J 3/0205 |
| 2021/0116303 A1 | 4/2021 | Yang et al. | |
| 2022/0022784 A1 * | 1/2022 | Boukhayma | A61B 5/14546 |
| 2022/0042908 A1 * | 2/2022 | Scarcelli | G02B 21/361 |

FOREIGN PATENT DOCUMENTS

| | | |
|---|---|---|
| EP | 0474264 A2 | 2/1991 |
| EP | 2806263 A1 | 11/2014 |
| WO | WO2018055357 A1 | 3/2018 |
| WO | WO2018102467 A1 | 6/2018 |

OTHER PUBLICATIONS

Nissinen, I. et al., "On the effects of the time gate position and width on the signal-to-noise ratio for detection of Raman spectrum in a time-gated CMOS single-photon avalanche diode based sensor," El Sevier, Sensors and Actuators B: Chemical, vol. 241, Mar. 31, 2017, pp. 1145-1152.

(56) References Cited

OTHER PUBLICATIONS

Cooper, John B. et al., "Sequentially Shifted Excitation Raman Spectroscopy: Novel Algorithm and Instrumentation for Fluorescence-Free Raman Spectroscopy in Spectral Space", Society for Applied Spectroscopy, vol. 67, No. 8, 2013, pp. 973-984.

Kabuss, Julia et al., "Theory of time-resolved Raman scattering and fluorescence emission from semiconductor quantum dots", The American Physical Society, Physical Review B 81, 075314 (2010), Feb. 18, 2010.

* cited by examiner

700A

```
1.   function [Ramanshift yfiltered nfilter] = filtersimu(x,y,lwl,ln,fbw)

2.   %simulation for filter set plus laser set

3.   %Input:
4.   % x: x axis (wavenumber) of reference spectra
5.   % y: y axis (intensity) of reference spectra
6.   % lwl: laser wavelength
7.   % ln: number of lasers
8.   % fbw: filter bandwidth
9.   % ln: number of lasers
10.  %

11.  lw=[lwl:fbw:lwl+fbw*(ln-1)];

12.  for i=1:ln
13.  wl(:,i)=1./(-x./10000000+1/lw(1,i));
14.  end;

15.  startwl=floor(min(min(wl)));
16.  endwl=ceil(max(max(wl)));
17.  wlrange=endwl-startwl;
18.  nfilter=floor(wlrange/ln/fbw);

19.  filterwl=[startwl:fbw:endwl]';

20.  filter=zeros(nfilter*ln,1);
21.  for i=1:nfilter;
22.  filter((i-1)*ln+1,1)=1;
23.  end;

24.  filtersize=nfilter*ln;
```

```
25.  if size(filterwl,1)>filtersize
26.  filterwl=filterwl(1:filtersize,1);
27.  end;

28.  for j=1:ln;
29.  for i=1:filtersize-1;
30.  rt=find(wl(:,j)>=filterwl(i,1)&wl(:,j)<filterwl(i+1,1));
31.  ycombine(i+1,j)=sum(y(rt,1));
32.  end;
33.  end;

34.  for i=1:ln;
35.  yfiltered(:,i)=ycombine(:,i).*filter;
36.  end;

37.  for i=1:ln;
38.  ramanshift(:,i)=(1/lw(1,i)-1./filterwl)*10000000;
39.  end;

40.  ramanshift(yfiltered == 0) = [];
41.  yfiltered(yfiltered == 0) = [];
42.  [ramanshift sorted_index] = sort(ramanshift);

43.  yfiltered = yfiltered(sorted_index);

44.  figure;
45.  plot(x,y*7);
46.  hold on;
47.  plot(ramanshift, yfiltered,'r');
```

FIG. 7B

WEARABLE SPECTROSCOPY USING FILTERED SENSOR

FIELD OF THE INVENTION

The present technology pertains to spectroscopy and more specifically to high-resolution spectroscopy using filtered image sensors.

BACKGROUND ART

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Spectroscopy (or spectrography) refers to techniques that employ radiation in order to obtain data on the structure and properties of matter. Spectroscopy involves measuring and interpreting spectra that arise from the interaction of electromagnetic radiation (e.g., a form of energy propagated in the form of electromagnetic waves) with matter. Spectroscopy is concerned with the absorption, emission, or scattering of electromagnetic radiation by atoms or molecules.

Spectroscopy can include shining a beam of electromagnetic radiation onto a desired sample in order to observe how it responds to such stimulus. The response can be recorded as a function of radiation wavelength, and a plot of such responses can represent a spectrum. The energy of light (e.g., from low-energy radio waves to high-energy gamma-rays) can result in producing a spectrum.

SUMMARY OF THE INVENTION

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to various systems and methods for spectroscopy. Specifically, a method for spectroscopy may comprise: illuminating, with a tunable laser, an analyte with first light, the first light having a first excitation wavelength; detecting, with a filtered sensor, a first Raman signal; illuminating, with the tunable laser, the analyte using second light, the second light having a second excitation wavelength, the second excitation wavelength being larger than the first excitation wavelength by a first predetermined increment; detecting, with the filtered sensor, a second Raman signal, the second Raman signal being shifted from the first Raman signal by a second predetermined increment; illuminating, with the tunable laser, the analyte using third light, the third light having a third excitation wavelength, the third excitation wavelength being larger than the second excitation wavelength by the first predetermined increment; and detecting, with the filtered sensor, a third Raman signal, the third Raman signal being shifted from the second Raman signal by the second predetermined increment. The method for spectroscopy may further comprise: constructing a Raman spectrum, with a computing system, using the first Raman signal, the second Raman signal, and the third Raman signal; and determining at least one molecule of the analyte, with the computing system, using the Raman spectrum and a database of predetermined Raman spectra.

BRIEF DESCRIPTION OF THE DRAWINGS

Embodiments are illustrated by way of example, and not by limitation, in the figures of the accompanying drawings, in which like references indicate similar elements and in which:

FIGS. 7A and 7B show an example program for determining a number of filters, a number of steps, and a step size, in accordance with some embodiments.

DETAILED DESCRIPTION

Figure 1A:
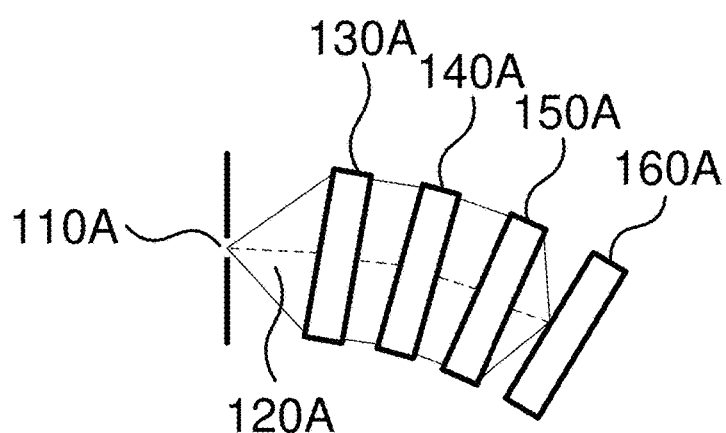
FIGS. 1A-C are simplified block diagrams of spectrometers, according to some embodiments.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. Like or analogous elements and/or components, referred to herein, may be identified throughout the drawings with like reference characters. In addition, several of the figures are merely schematic representations of the present technology. As such, some of the components may have been distorted from their actual scale for pictorial clarity.

Figure 1B:
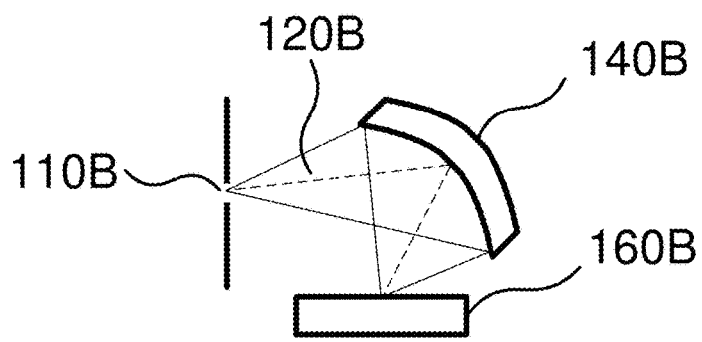
Figure 1C:
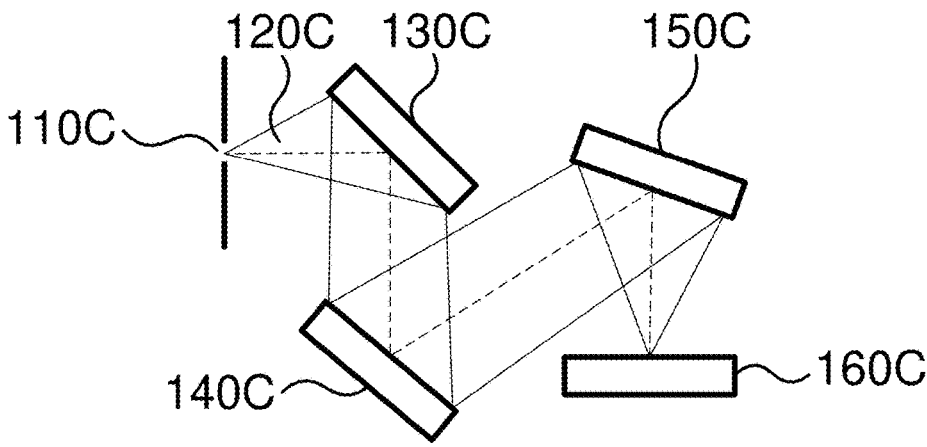

FIGS. 1A-1C depict various spectrometers 100A-100C, according to some embodiments. For example, spectrometers 100A and 100C are optical systems having two lenses/mirrors 130A+150A and 130C+150C (respectively) that produce an image of input slit 110A and 110C (respectively) on detector 160A and 160C (respectively). In between lenses/mirrors 130A+150A and 130C+150C is diffraction grating 140A and 140C (respectively) which disperses different wavelengths at different angles. The dispersion causes different wavelengths of light 120A and 120C entering input slit 110A and 110C (respectively) to be imaged on different positions on detector 160A and 160C (respectively). Detectors 160A and 160C can use light focused onto them to measure the intensity of particular spectrum of light 120A and 120C (respectively). In spectrometer 100B, grating 140B can be concave and act as both a dispersive and focusing element. Grating 140B focuses and disperses light 120B entering input slit 110E to be imaged on different positions on detector 160B.

To operate, spectrometers 100A-100C employ a three-dimensional arrangement of bulk optics (e.g., lenses, mirrors, gratings, etc.). The bulk optics can be large and heavy. For example, Raman spectroscopy typically requires high resolution, on the order of 5-10 wave numbers. As spectrometers 100A-100C become smaller, resolution is lost, such as from reduced focal lengths of some bulk optics. Were spectrometers 100A-100C reduced to a 5 cm×5 cm area, the resolution would be on the order of 20-40 wave numbers. Accordingly, for some applications spectrometers 100A-100C have the disadvantage of large size (e.g., they cannot be worn like a watch, fitness tracker, smart watch, and the like).

Figure 2:
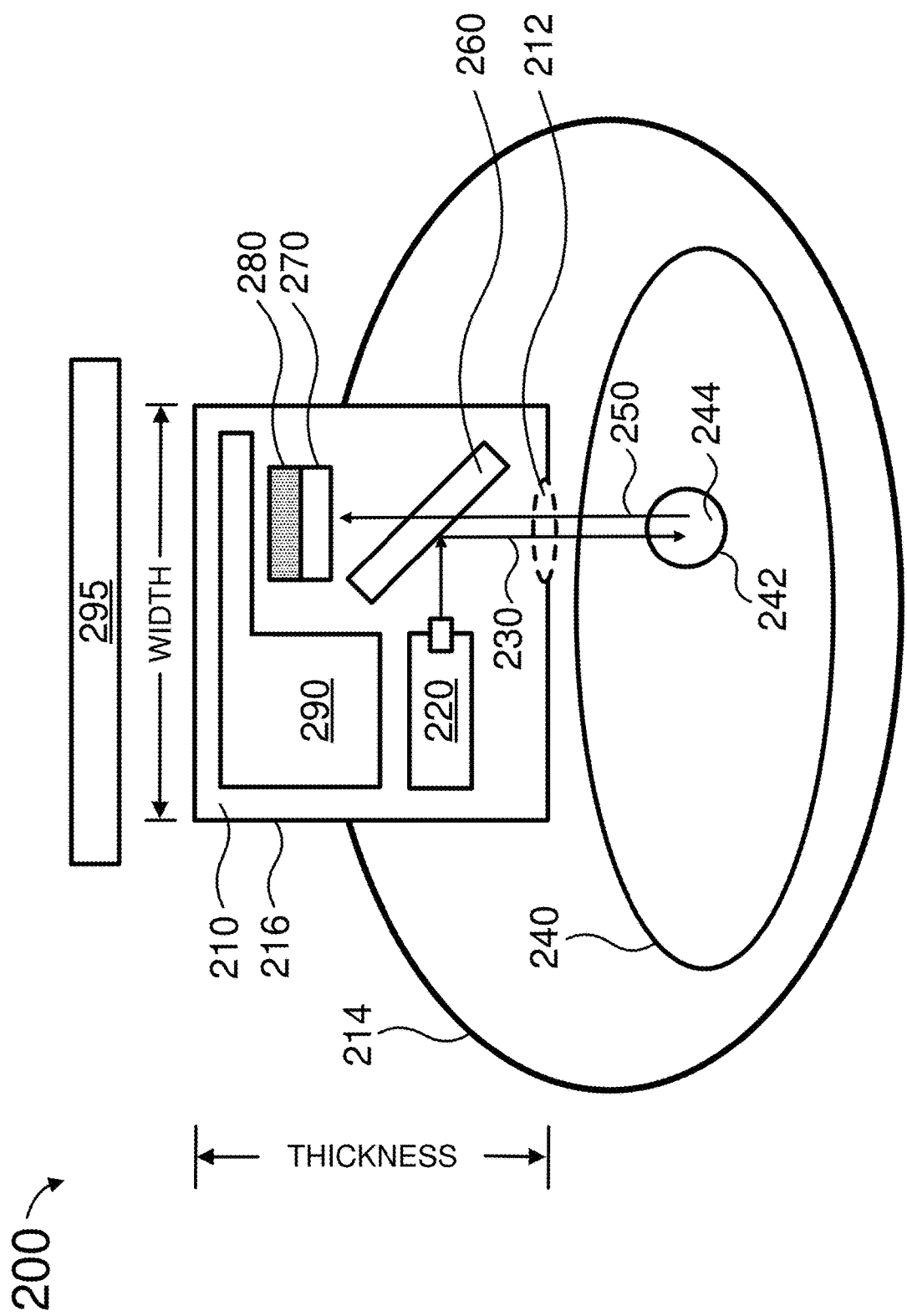
FIG. 2 is a simplified block diagram of a wearable spectroscopy system, according to various embodiments.

FIG. 2 is a simplified block diagram of wearable spectroscopy system 200, according to some embodiments. System 200 includes spectrometer 210, analyte 240, and optional computing system 295. Spectrometer 210 can include opening 212, optional band 214, case (or housing) 216, excitation light source 220, beam splitter 260, filter 270, detector 280, and electronics 290. Spectroscopy system 200 is described below in relation to Raman spectroscopy purely for illustrative purposes and not limitation. Embodiments of spectroscopy system 200 can be used for other spectroscopy applications.

According to some embodiments, excitation light source 220 is a monochromatic light source, such as a laser. For example, excitation light source 220 is at least one of an Nd:YAG (neodymium-doped yttrium aluminium garnet; Nd:Y3Al5O12), Argon-ion, He—Ne, and diode laser. By way of further non-limiting example, excitation light source 220 can provide light (electromagnetic waves) in a range between ultra-violet (UV) light (e.g., electromagnetic radiation with a wavelength from 10 nm to 400 nm) and short-wave near-infrared (NIR) (1.4 µm to 3 µm), including portions of the electromagnetic spectrum in-between, such as visible light (e.g., 380 nm-760 nm) and NIR light (e.g., 0.75 µm to 1.4 µm).

Excitation light source 220 can be tunable—a wavelength of the light from excitation light source 220 is changed by one or more (predetermined) increments and/or to one or more (predetermined) values—such as by using temperature (heat) control (e.g., from a heating element), electrical control (e.g., using microelectromechanical systems (MEMS)), and mechanical control (e.g., using a mechanism to turn a mirror). In various embodiments, excitation light source 220 is in a transistor outline (TO) package have three leads: anode, cathode, and ground. Preferably, excitation light source 220 provides high spectral purity, high wavelength stability, and/or high power stability output.

Using Raman spectroscopy as a non-limiting example, Raman signal strength is proportional to the power of the Raman laser (in milliwatts or mW) exciting the sample. In other words, the more laser power used, the larger the Raman signal will advantageously be. According to various embodiments, the power of excitation light source 220 can be in a range of 120 mW-1,000 mW.

Opening 212 can include an aperture in case 216. In some embodiments, the aperture can be in the form of a pinhole (e.g., circle), rectangle (e.g., (sharp-edged) slit), and other shapes. For example, the pinhole can be 10 µm-5,000 µm in diameter. By way of further non-limiting example, the rectangle can have a width in a range of 10 µm-5,000 µm and a length in a range of 500 µm-15,000 µm. The shape and size of the aperture can be compatible (e.g., match or mate) with filter 270 and the optical magnification of spectrometer 210.

In some embodiments, the aperture is an air aperture, air pinhole, air slit, and the like (e.g., open to the air, uncovered). Alternatively, opening 212 can include a window to prevent contaminants (e.g., moisture, dust, dirt, and the like) from entering case 216, such as for water and/or dust resistance. In various embodiments, the window can be plexiglass, mineral glass, quartz, synthetic sapphire, and the like. The window can transmit (e.g., does not block or filter) light 230 and light 250.

Beam splitter 260 can be an optical device which reflects some light and passes other light (e.g., based upon the light's angle of incidence). For example, beam splitter 260 can reflect light 230 from excitation light source 220 through opening 212 and onto analyte 240. By way of further non-limiting example, beam splitter can transmit light 250 (e.g., Raman scatter) to detector 280 through filter 270. Beam splitter 260 can be made of glass or plastic, and include a transparently thin coating of dielectric material(s) and/or metal (e.g., aluminum, magnesium, and the like).

Figure 3A:
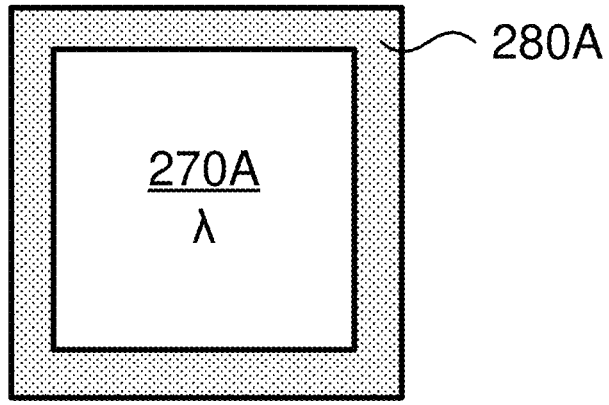
FIGS. 3A-C are simplified representations of filtered image sensors, in accordance with some embodiments.
Figure 3B:
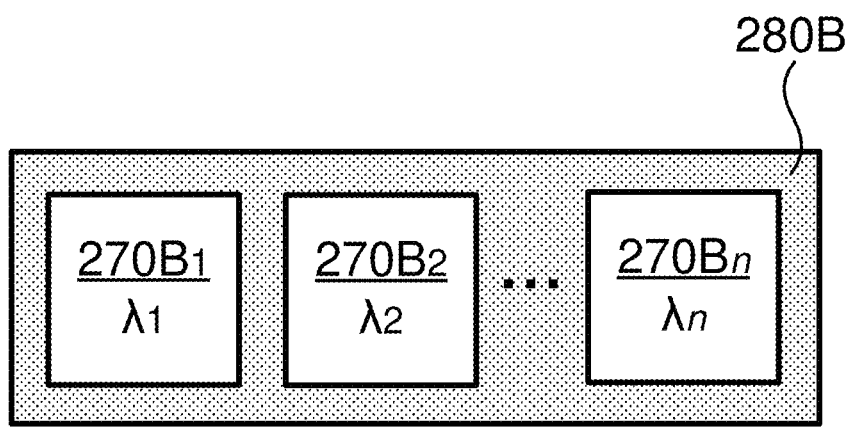
Figure 3C:
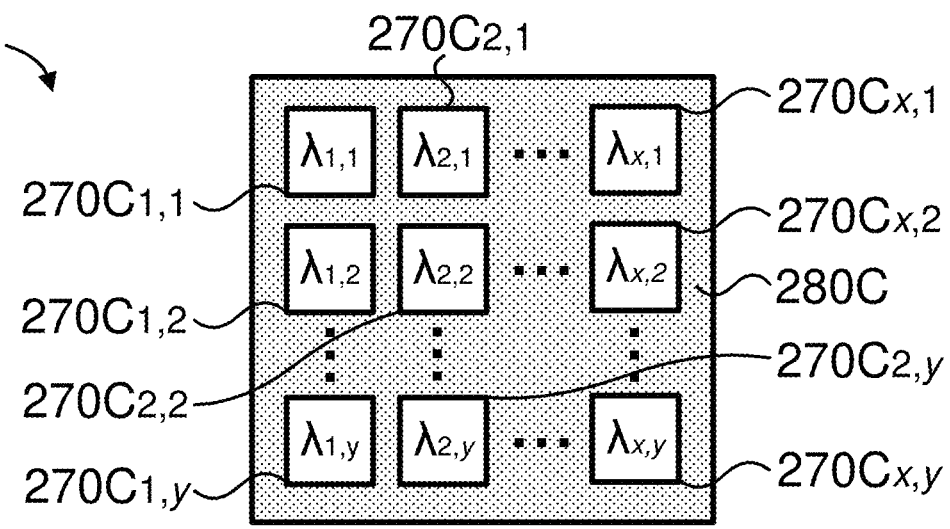

Filter 270 transmits a particular wavelength (or range of wavelengths) of light to detector 280 (and blocks the rest). As illustrated in FIGS. 3A-3C, filter 270 can be a one-dimensional, two-dimensional, or three-dimensional array of separate filters, each filter transmitting light centered around a different (or same) wavelength (λ) to detector 280. Filter 270 can be disposed on detector 280. For example, (the constituent filters of) filter 270 can be a thin-film coating—on the order of nanometers to microns thick—deposited onto filter 270 using thin-film deposition techniques. By way of further non-limiting example, (the constituent filters of) filter 270 can be made of glass or plastic, cut, and mounted onto detector 280. (The constituent filters of) Filter 270 can be any transparent material that transmits electromagnetic radiation centered around a particular wavelength or a (narrow) range of wavelengths (and blocks the rest).

Detector 280 receives light 250 and measures the intensity of scattered light. Detector 280 can be a one-, two-, or three-dimensional detector array comprised of a semiconductor material such as silicon (Si) and indium gallium arsenide (InGaAs). In some embodiments, a bandgap energy of the semiconductor determines an upper wavelength limit of detector 280. An array of detector 280 can be in different configurations, such as charged coupled devices (CCDs), back-thinned charge coupled devices (BT-CCDs), complementary metal-oxide-semiconductor (CMOS) devices, and photodiode arrays (PDAs). CCDs can be one or more of intensified CCDs (ICCDs) with photocathodes, back illuminated CCDs, and CCDs with light enhancing coatings (e.g., Lumogen® from BASF®). Detector 280 can have a resolution of 8-15 wavenumbers, according to some embodiments. Detector 280 can be used to detect concentrations of molecules in a range of 1 mg-1,000 mg per deciliter (mg/dL).

By way of further non-limiting example, detector 280 is a single pixel time-gated detector such as single-photon avalanche diode (SPAD), micro-channel plate (MCP), photomultiplier tube (PMT), silicon photomultiplier (SiPM), or avalanche photodiode (APD) that sits on a scanning motor driven rail, or detector arrays such as a single-photon avalanche diode (SPAD) array, or an intensified CCD (ICCD). A SPAD is a solid-state photodetector in which a photon-generated carrier (via the internal photoelectric effect) can trigger a short-duration but relatively large avalanche current. The leading edge of the avalanche pulse marks the arrival (time) of the detected photon. The avalanche current can continue until the avalanche is quenched (e.g., by lowering a bias voltage down to a breakdown voltage). According to various embodiments, each pixel in some SPAD arrays can count a single photon and the SPAD array can provide a digital output (e.g., a 1 or 0 to denote the presence or absence of a photon for each pixel).

To detect another photon, electronics 290 can be used to read out measurements and quench the SPAD. For example, electronics 290 can sense the leading edge of the avalanche current, generate a (standard) output pulse synchronous with the avalanche build up, quench the avalanche, and restore the diode to an operative level. Electronics 290 can provide passive quenching (e.g., passive quenching passive reset (PQPR), passive quench active reset (PQAR), and the like) and/or active quenching (e.g., active quench active reset (AQAR), active quenching passive reset (AQPR), and the like). In various embodiments, detector 280 is a complementary metal-oxide semiconductor (CMOS) SPAD array.

A micro-channel plate (MCP) is a planar component used for detection of single particles, such as photons. An MCP can intensify photons by the multiplication of electrons via secondary emission. Since a microchannel plate detector has many separate channels, it can also provide spatial resolution.

A photomultiplier tube (PMT) is a photoemissive device which can detect weak light signals. In a PMT, absorption of a photon results in the emission of an electron, where the electrons generated by a photocathode exposed to a photon flux are amplified. A PMT can acquire light through a glass or quartz window that covers a photosensitive surface, called a photocathode, which then releases electrons that are multiplied by electrodes known as metal channel dynodes. At the end of the dynode chain is an anode or collection electrode. Over a very large range, the current flowing from the anode to ground is directly proportional to the photoelectron flux generated by the photocathode.

Silicon photomultipliers (SiPM) are solid-state single-photon-sensitive devices based on Single-photon avalanche diode (SPAD) implemented on a common silicon substrate. Each SPAD in an SiPM can be coupled with the others by a metal or polysilicon quenching resistor.

Avalanche photodiodes (APDs) are semiconductor photodiodes with an internal gain mechanism. In an APD, absorption of incident photons creates electron-hole pairs. A high reverse bias voltage creates a strong internal electric field, which accelerates the electrons through the semiconductor crystal lattice and produces secondary electrons by impact ionization. The resulting electron avalanche can produce gain factors up to several hundred.

An intensified charge-coupled device (ICCD) is a CCD that is optically connected to an image intensifier that is mounted in front of the CCD. An image intensifier can include three functional elements: a photocathode, a microchannel plate (MCP) and a phosphor screen. These three elements can be mounted one close behind the other. The photons which are coming from the light source fall onto the photocathode, thereby generating photoelectrons. The photoelectrons are accelerated towards the MCP by an electrical control voltage, applied between photocathode and MCP. The electrons are multiplied inside of the MCP and thereafter accelerated towards the phosphor screen. The phosphor screen converts the multiplied electrons back to photons which are guided to the CCD by a fiber optic or a lens. An image intensifier inherently includes shutter functionality. For example, when the control voltage between the photocathode and the MCP is reversed, the emitted photoelectrons are not accelerated towards the MCP but return to the photocathode. In this way, no electrons are multiplied and emitted by the MCP, no electrons are going to the phosphor screen, and no light is emitted from the image intensifier. In this case no light falls onto the CCD, which means that the shutter is closed.

Detector 280 can be other photodetectors having a time resolution of about one nanosecond or less. By way of further non-limiting example, detector 280 is a streak camera array, which can have a time-resolution of around 180 femtoseconds. A streak camera measures the variation in a pulse of light's intensity with time. A streak camera can transform the time variations of a light pulse into a spatial profile on a detector, by causing a time-varying deflection of the light across the width of the detector.

A spectral resolution of a spectrum measured by detector 280 can depend on the number of pixels (e.g., discrete photodetectors) in detector 280. A greater number of pixels can provide a higher spectral and spatial resolutions. Detector 280 can comprise a one-dimensional, two-, or three-dimensional array of pixels. For example, detector 280 can be in a range of 32 to 1,048,576 pixels, or even 2,099,152 pixels.

Electronics 290 can include a power source (e.g., (re-)chargeable) lithium-ion battery) and computing system (not depicted in FIG. 2). In various embodiments, electronics 290 includes a system on a chip (SoC) (not depicted in FIG. 2). An SoC is an integrated circuit that includes (all) components of a computer system on a single substrate. The components can include assorted combinations of a central processing unit (CPU), memory, input/output ports, secondary storage, and digital, analog, mixed-signal, and radio frequency signal processing functions. For example, electronics 290 can optionally include circuits for wired and/or wireless communications (e.g., with computing system 295). Electronics can optionally include circuits and interfaces for wired and/or wireless (inductive) charging of the power source.

Electronics 290 can optionally include a control surface (e.g., physical or virtual push button/switch) and/or a display (e.g., touch display) for receiving inputs and/or providing outputs to a user. Computing systems are described further in relation to FIG. 8. Electronics 290 can be coupled to excitation light source 220 and detector 280, such as for power, data, and control purposes. In various embodiments, when a measurement is to be taken (e.g., input is received from a user, periodic measurement controlled by electronics 290, etc.), electronics 290 can control excitation light source 220 to provide light 230 (e.g., emit a laser pulse). A predetermined amount of time after light 230 is provided, electronics 290 can provide a signal directing detector 280 to (effectively) stop detecting and provide measurements (e.g., report a photon count at that time). For example, the predetermined amount of time can be selected using the duration of light 230 (e.g., a laser pulse), characteristics of analyte 240 (e.g., duration/lifetime of fluorescence), and the like.

Shapes and a spatial arrangement of the constituent parts of spectrometer 210 (e.g., excitation light source 220, beam splitter 260, filter 270, detector 280 (sometimes referred to herein as sensor 280), and electronics 290) are shown in FIG. 2 purely for illustrative purposes and not limitation. Other shapes and arrangements can be used. Having filter 270 disposed on sensor 280, advantageously allows a one- or two-dimensional arrangement of opening 212, beam splitter 260, filter 270, and sensor 280. Moreover, bulk optics (and their associated size and weight) are not required by spectrometer 210. According to various embodiments, case (or housing) 216 of spectrometer 210 can be approximately 30 mm-50 mm wide (width) and 5 mm-20 mm thick (thickness). Case 216 can be made of metal (e.g., platinum, gold, gold plate, silver, stainless steel, titanium, tungsten carbide, etc.), ceramic, tantalum, plastic, and combinations thereof.

Spectrometer 210 can provide information about molecular vibrations to identify and quantify characteristics (e.g., molecules) of analyte 240. Spectrometer 210 can direct light (electromagnetic waves) 230 from excitation light source 220 onto analyte 240. Light 230 from excitation light source 220 can be said to be shone on analyte 240 and/or analyte 240 can be said to be illuminated by excitation light source 220 and/or light 230. When (incident) light from excitation light source 220 hits analyte 240, the (incident) light scatters. A majority (e.g., 99.999999%) of the scattered light is the same frequency as the light from excitation light source 220 (e.g., Rayleigh or elastic scattering).

A small amount of the scattered light (e.g., on the order of $10^{-6}$ to $10^{-8}$ of the intensity of the (incident) light from excitation light source 220) is shifted in energy from the frequency of light 230 from excitation light source 220. The shift is due to interactions between (incident) light 230 from excitation light source 220 and the vibrational energy levels of molecules in analyte 240. (Incident) Light 230 interacts with molecular vibrations, phonons, or other excitations in analyte 240, causing the energy of the photons (of light 230 from excitation light source 220) to shift up or down (e.g., Raman or inelastic scattering). Light 250 can include, for example, at least one of Raman scatter, fluorescence, and Rayleigh scattering. The shift in energy of light 250 (e.g., Raman scatter from analyte 240) can be used to identify and quantify characteristics (e.g., molecules) of analyte 240.

System 200 can include computing system 295. According to various embodiments, computing system 295 can be communicatively coupled to spectrometer 210 using various combinations and permutations of wired and wireless communications (e.g., networks) described below in relation to FIG. 8. In some embodiments, computing system 295 can include a database of Raman spectra associated with known molecules and/or remotely access the database over a communications network (not shown in FIG. 2). Computing system 295 can receive intensity measurements from spectrometer 210, produces at least one Raman spectrum using data (e.g., intensity measurements) from spectrometer 210, and identifies and/or quantifies molecules in analyte 240 using the at least one Raman spectrum and a database of Raman spectra associated with known molecules.

In some embodiments, computing system 295 is a single computing device. For example, computing system 295 is a desktop or notebook computer communicatively coupled to Spectrometer 210 through a Universal Serial Bus (USB) connection, a Wi-Fi connection, Bluetooth and the like. In various embodiments, computing system 295 can be various combinations and permutations of stand-alone computers (e.g., smart phone, phablet, tablet computer, notebook computer, desktop computer, etc.) and resources in a cloud-based computing environment. For example, computing system 295 is a smart phone and a cloud-based computing system.

The smart phone can receive data (e.g., intensity measurements) from spectrometer 210 using USB, Wi-Fi, Bluetooth, and the like. The smart phone can optionally produce at least one Raman spectrum using the data. The smart phone can transmit the data and/or at least one Raman spectrum to a cloud-based computing system over the Internet using a wireless network (e.g., cellular network). The cloud-based computing system can produce at least one Raman spectrum using the data and/or quantify and/or identify molecules in analyte 240 using the recovered Raman spectrograph.

Computing system 295 can alternatively or additionally be a cloud computing system which receives data (e.g., intensity measurements) from spectrometer 210 (using USB, WiFi, Bluetooth, cellular network and the like), produce at least one Raman spectrograph using the data, and quantify and/or identify molecules in analyte 240 using the Raman spectrograph. Computing system 295 is described further in relation to FIG. 8.

According to some embodiments, analyte 240 is at least one of solid, liquid, plant tissue, human tissue, and animal tissue. For example, animal tissue is one or more of epithelial, nerve, connective, muscle, and vascular tissues. By way of further non-limiting example, plant tissue is one or more of meristematic (e.g., apical meristem and cambium), protective (e.g., epidermis and cork), fundamental (e.g., parenchyma, collenchyma and sclerenchyma), and vascular (e.g., xylem and phloem) tissues. Purely for the purposes of illustration and not limitation, analyte 240 is depicted as a cross-section of a human limb, such as a wrist, and includes blood vessel 242 and blood 244. Band 214 can be used secure spectrometer 210 to analyte 240 (e.g., the wrist). For example, spectrometer 210 is in contact with analyte 240 (e.g., spectrometer 210 is no more than 1 cm from analyte 240). Band 214 can be made from metal, plastic, and combinations thereof.

FIGS. 3A-3C illustrate configurations of filter 270 and detector 280 (FIG. 2) according to some embodiments. FIG. 3A shows configuration 300A with filter 270A disposed on sensor 280A (e.g., a 1×1 arrangement). Filter 270A transmits light (in a wavelength range) centered around wavelength A. FIG. 3B depicts configuration 300B with filters 270B$_1$-270B$_n$ disposed on sensor 280B (e.g., a 1×n array). Filters 270B$_1$-270B$_n$ transmit light (in a wavelength range) centered around wavelengths $\lambda_1$-$\lambda_n$, respectively. FIG. 3C shows configuration 300C with filters 270C$_{1,1}$-270C$_{x,y}$ disposed on sensor 280C (e.g., an x×y array). Filters 270C$_{1,1}$-270C$_{x,y}$ transmit light (in a wavelength range) centered around wavelengths $\lambda_{1,1}$-$\lambda_{x,y}$, respectively. Although filters 270A, 270B$_1$-270B$_n$, and 270C$_{1,1}$-270C$_{x,y}$ are shown in FIGS. 3A, 3B, and 3C (respectively) as having a roughly square shape, other shapes such as circles, rectangles, and other polygons can be used.

Figure 4:
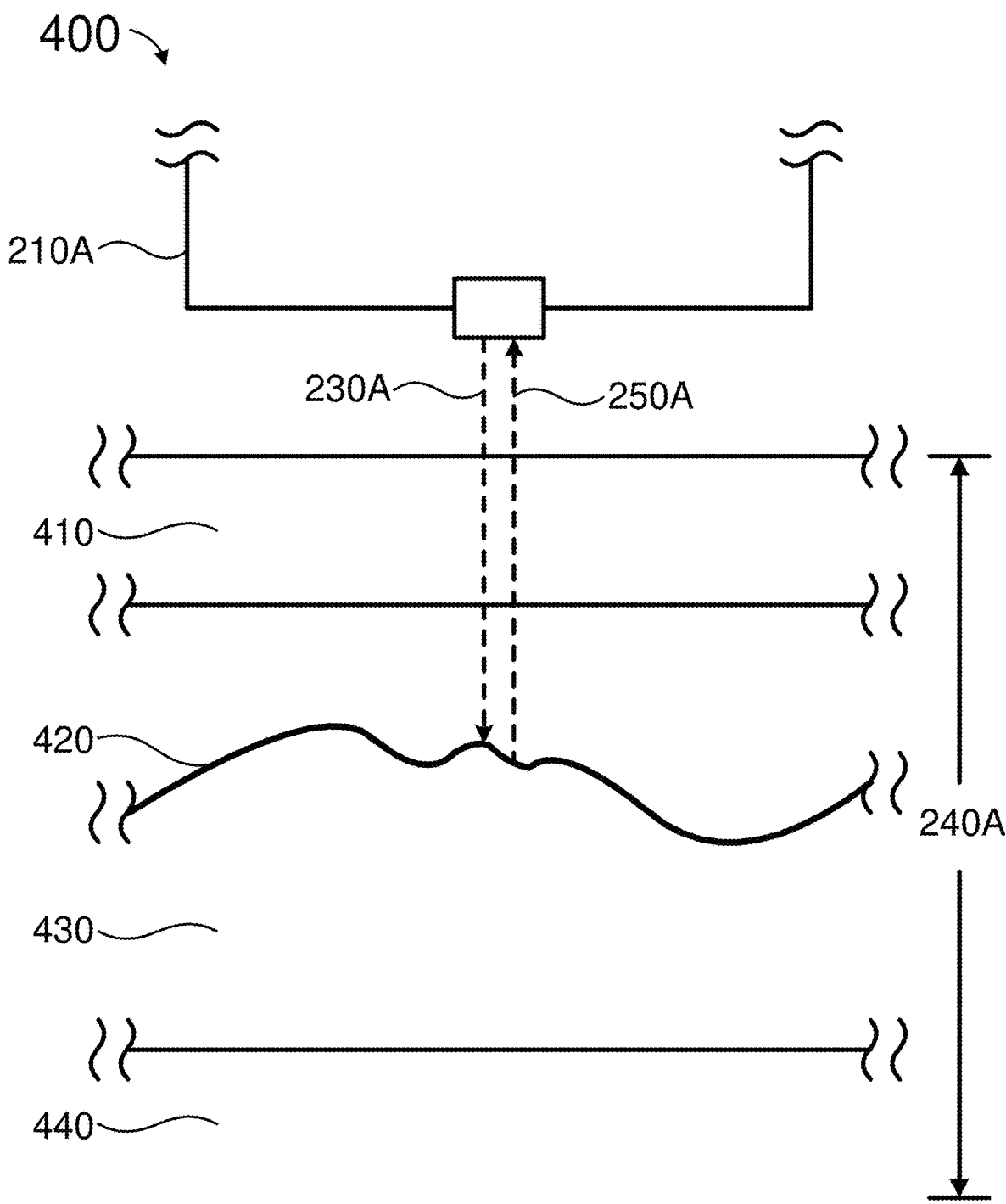
FIG. 4 is an alternate view of the system of FIG. 2, in accordance with various embodiments.

FIG. 4 shows system 400, which is a simplified alternate view of system 200 (FIG. 2), in accordance with some embodiments. System 400 includes spectrometer 210A and analyte 240A. Spectrometer 210A has at least some of the characteristics of spectrometer 210 (FIG. 2). Analyte 240A has at least some of the characteristics of analyte 240 (FIG. 2).

Analyte 240A can include layers, such as epidermis 410, dermis 430, and subcutaneous (fatty) tissue 440. Dermis 430 includes blood vessel 420 (e.g., vein and/or artery). For pictorial clarity, some features of epidermis 410, dermis 430, and subcutaneous (fatty) tissue 440 (e.g., hair shaft, sweat pore and duct, sensory nerve ending, sebaceous gland, pressure sensor, hair follicle, stratum, and the like) are not shown in FIG. 4.

Light 230A can have at least some of the characteristics of light 230 (FIG. 2). Light 250A can have at least some of the characteristics of light 250 (FIG. 2). Light 230A (e.g., from excitation light source 220 (FIG. 2)) illuminates analyte 240A. Light 230A can pass through epidermis 410 to dermis 430. Photons of light can bounce off molecules inside blood vessel 420. (Resulting) Light 250A (e.g., Raman scatter among others) is received by detector 280 (FIG. 2).

An optimal location for taking blood measurements is where the blood is, for example, blood vessel 420. Measurement accuracy can be compromised when light 230A overshoots or undershoots blood vessel 420. In human beings, blood vessel 420 is on the order of 80 μm thick and epidermis 410 is on the order of 200 μm, so it is easy to overshoot and/or undershoot blood vessel 420 (e.g., misses blood vessel 420). Since spectrometer 210A is worn on a limb (e.g., using band 214 (FIG. 2), the distance from spectrometer 210A to blood vessel 420 does not appreciably change, ensuring light 230A bounces off of blood vessel 420 and a quality measurement can be taken.

Details of analyte 240A, such as epidermis 410, dermis 430, and subcutaneous (fatty) tissue 440, are provided purely by way of example and not limitation. Analyte 240A can include other, more, and/or fewer details than those illustrated in FIG. 4. Moreover, analyte 240A is depicted as human tissue purely for illustrative purposes and not limitation.

Figure 5A:
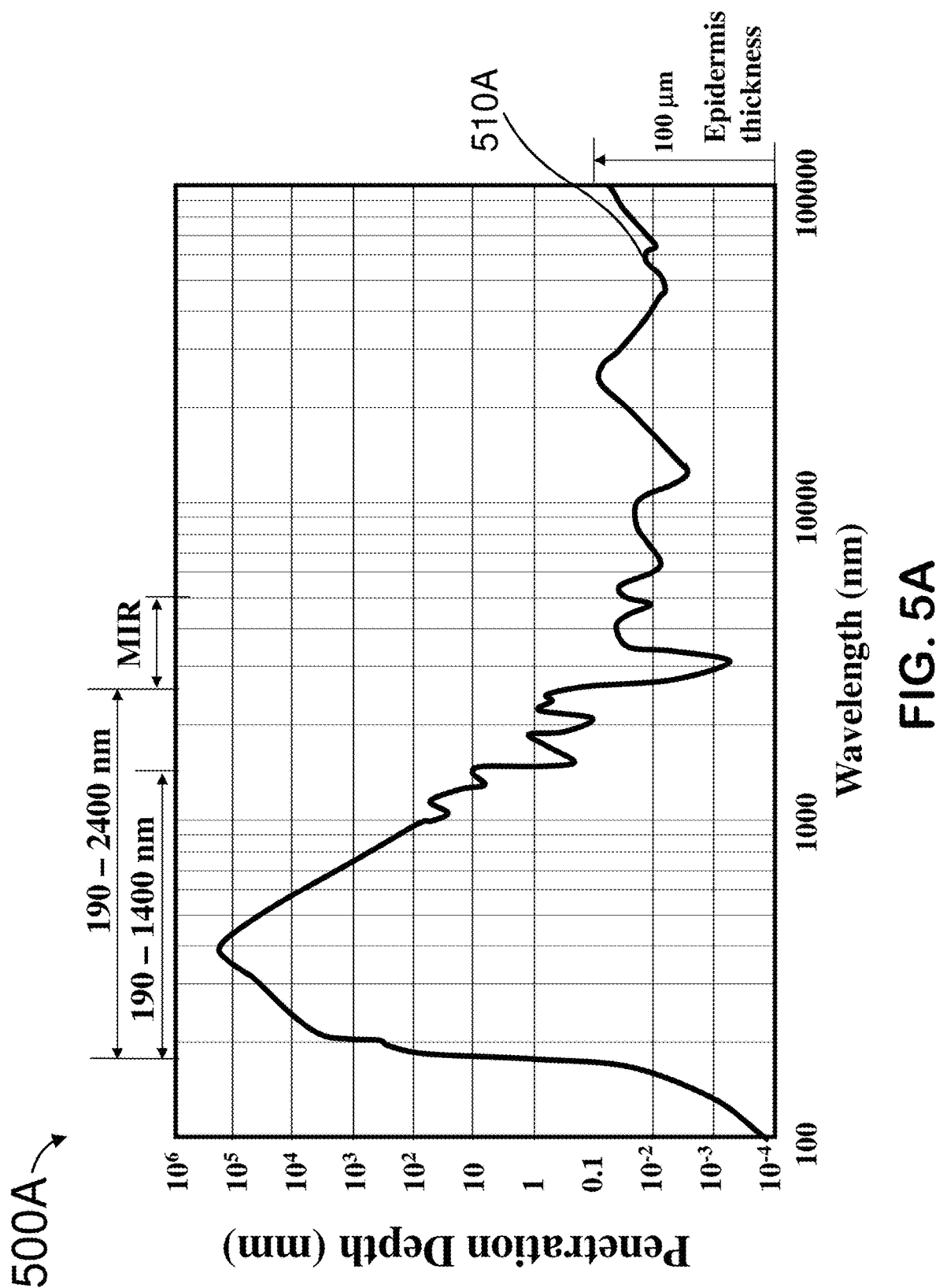
FIGS. 5A and 5B are graphical representations of penetration depth into liquid water and absorption spectra of biological tissues, respectively, according to some embodiments.

FIG. 5A is a graphical representation (e.g., plot, graph, and the like) 500A of penetration depth 510A into liquid water of light over excitation wavelength. By way of non-limiting example, an epidermis (e.g., epidermis 410 in FIG. 4) can have a thickness on the order of 100 μm, so an excitation wavelength of light (e.g., light 230 and light 230A in FIGS. 2 and 4, respectively) can be advantageously selected such that a penetration depth is at least 100 μm (e.g., approximately 190 nm to 2400 nm). In some embodiments, the excitation wavelength of light is in a range of 670 nm-900 nm for (human) tissue. Other ranges for the excitation wavelength of light can be used (e.g., depending on the depth of the tissue to be studied).

Figure 5B:
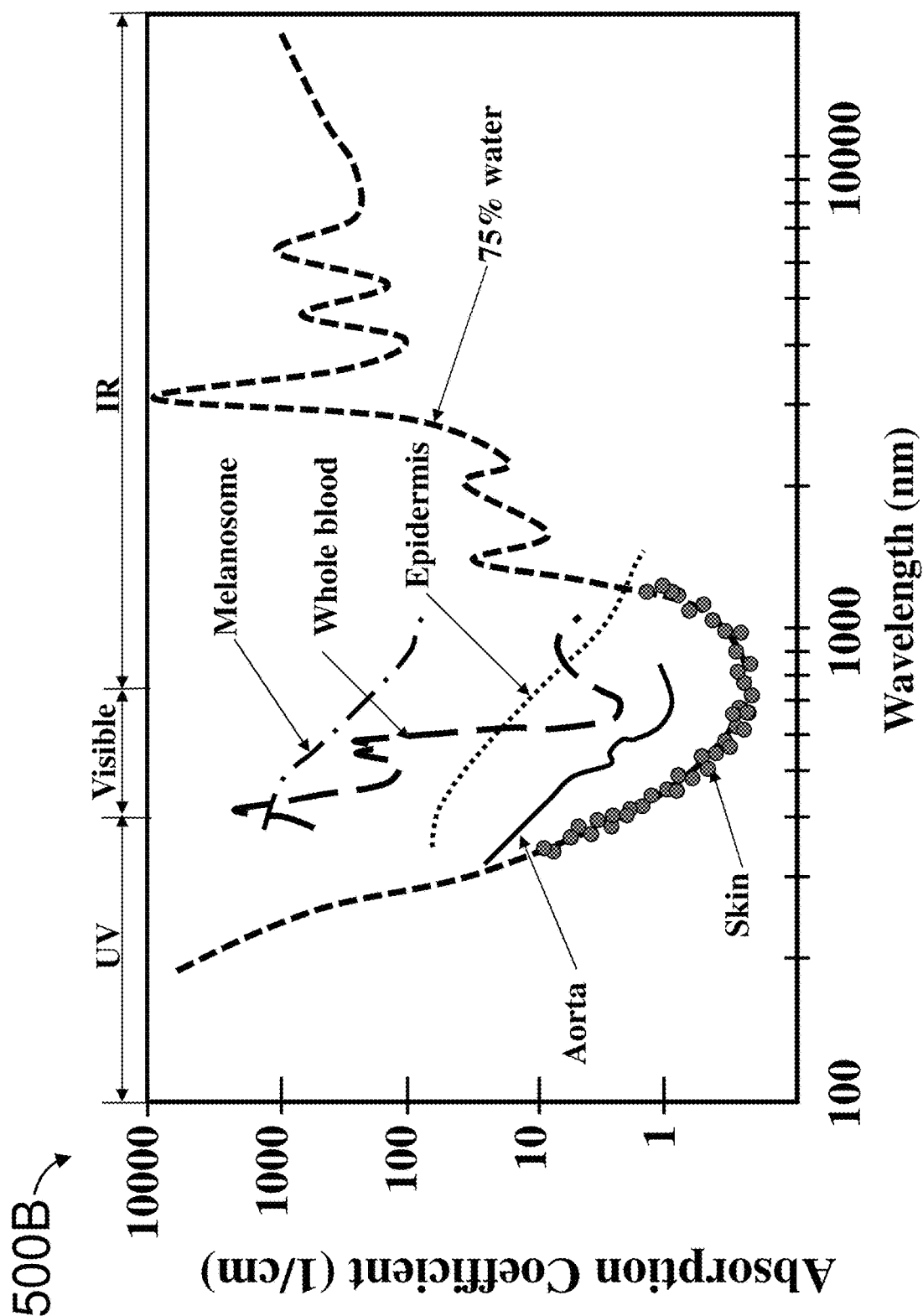

FIG. 5B is a graphical representation (e.g., plot, graph, and the like) 500B of absorption spectra of various tissues over excitation wavelength. By way of non-limiting example, an excitation wavelength of light (e.g., light 230 and light 230A in FIGS. 2 and 4, respectively) can be advantageously selected to minimize the absorption coefficient so as to minimize absorption of the light by the tissue to be studied (e.g., so the light can scatter and be detected). When the tissue substantially absorbs light and/or Raman scatter (among others) (e.g., 250 and 250A in FIGS. 2 and 4, respectively), there can be insufficient Raman electromagnetic radiation for detector 280 (FIG. 2) to detect. For example, in skin tissue that has highly fluorescent chromophores, the increased absorption amplifies the emitted fluorescence and masks the weaker Raman signal. In various embodiments, the excitation wavelength of light is in a range of 670 nm-900 nm for (human) tissue. Other ranges for the excitation wavelength of light can be used (e.g., depending on the absorption coefficient of the tissue to be studied).

In embodiments where analyte (e.g., 240 and 240A (FIGS. 2 and 4)) is alive (and not dead) animal (e.g., living, alive, etc.), blood 244 flows through blood vessel 242 and 420 (FIGS. 2 and 4). Blood flow through blood vessel 242 and 420 in animals (e.g., humans) is caused by a heart (not shown in FIG. 4) pumping blood (e.g., beating heart). When measurements are taken at a rate slower than blood flows, different samples of blood are measured instead of the same sample.

When spectrometer 210 and 210A (FIGS. 2 and 4) takes multiple measurements, the measurements can be taken before the molecules in blood illuminated in one measurement (e.g., blood sample) flow away and are not available for the next measurement. For example, a resting adult human heart can beat at approximately 60 to 100 beats a minute (~1 Hz). Spectrometer 210 and 210A can take measurements within a tenth of a second (~0.1 KHz) or less, such that measurements are taken faster than blood flows (e.g., multiple measurements are taken from the same (instead of different) sample). Slower and/or faster sampling rates (e.g., frequency at which measurements are taken) can be used depending on the heart rate associated with analyte 240 and 240A (FIGS. 2 and 4). In various embodiments, the sampling rate is 10 Hz-1 KHz.

Figure 6A:
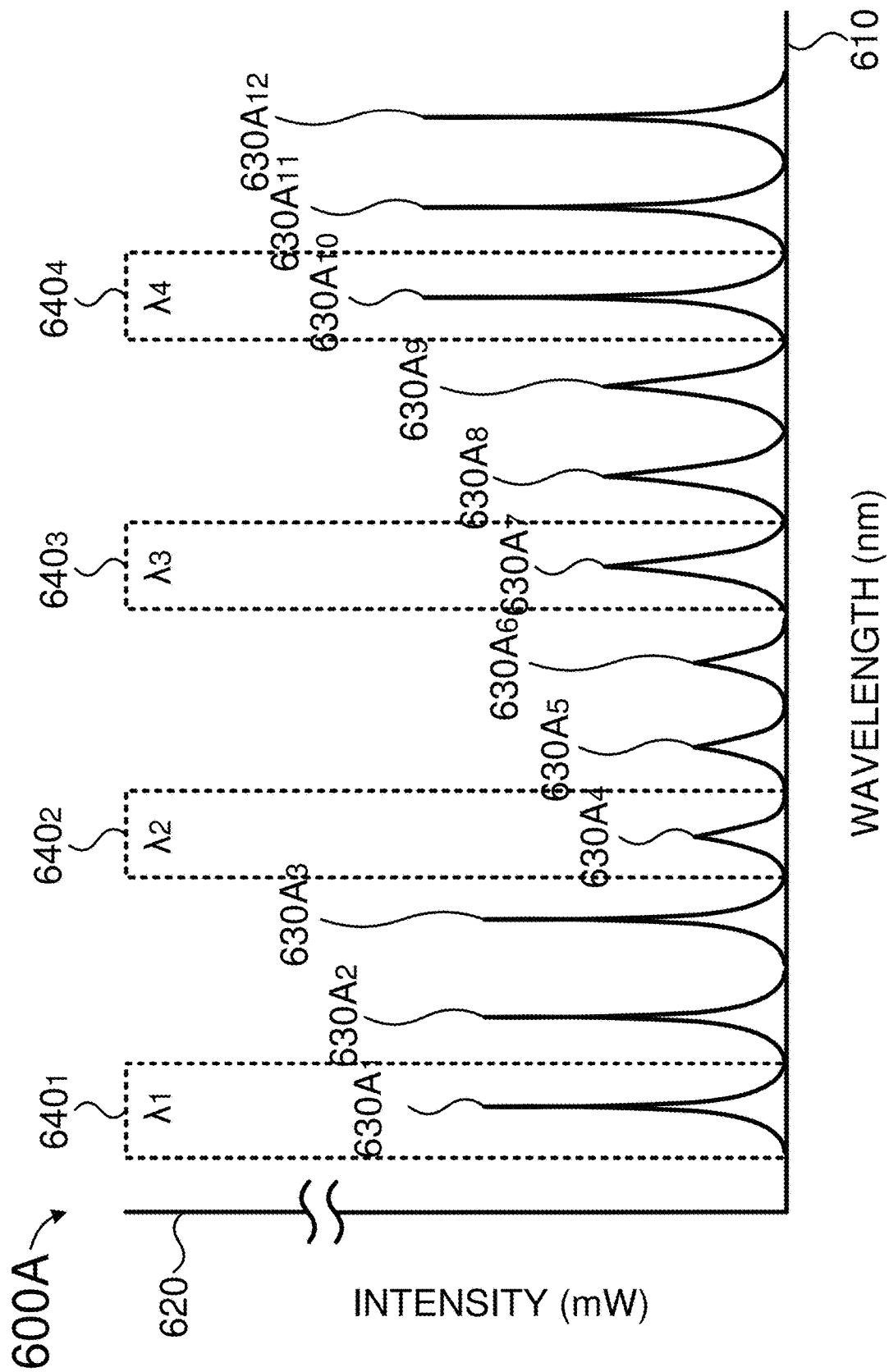
FIGS. 6A and 6B depict a Raman spectrum and a shifted Raman spectrum, respectively, according to various embodiments.
Figure 6B:
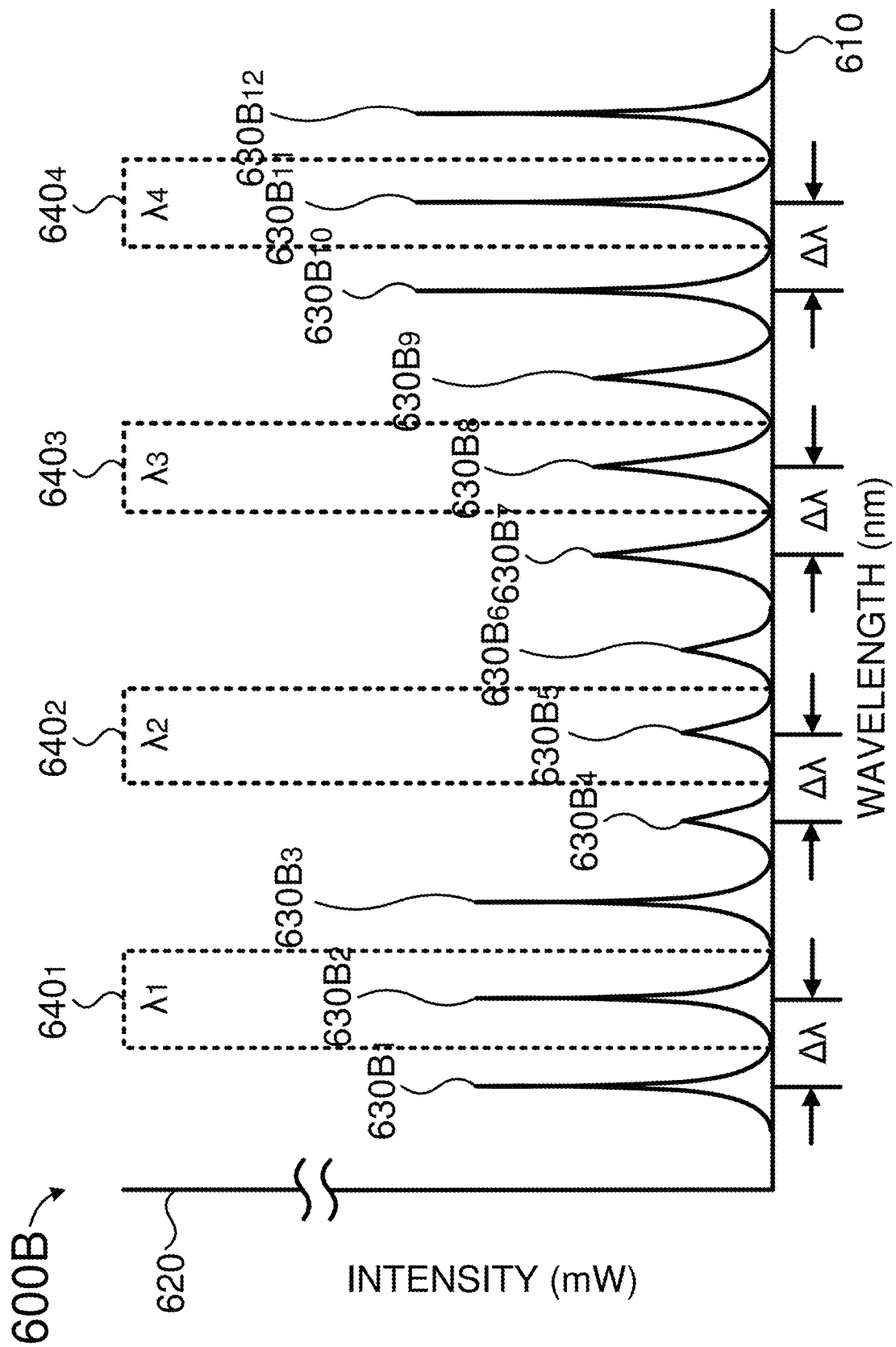

FIGS. 6A and 6B are graphical representations (e.g., plot, graph, and the like) 600A and 600B of received light intensity (in milliwatts (mW), other units can be a.u. (arbitrary units of intensity) and photon count) (along axis 620) over received light (Raman shift) wavelength (in nanometers (nm), other units can be wavenumber in $cm^{-1}$) (along axis 610), according to some embodiments. Graph 600A includes Raman signal $630A_1$-$630A_{12}$, collectively referred to as Raman signal 630A. Graph 600B includes Raman signal $630B_1$-$630B_{12}$, collectively referred to as Raman signal 630B. Raman signals 630A and 630B are Raman spectrographs for analyte 240 and 240A (FIGS. 2 and 4). Purely for illustration, Raman signals 630A and 630B are shown having peaks at regular intervals, but Raman signals 630A and 630B may have any number of peaks having different intensities and occurring at different/irregular frequencies. Raman signals 630A and 630B can result from excitation light source 220 emitting light (e.g., laser light) at different excitation wavelengths (λ).

(Each constituent filter of) Filter 270 (FIG. 2) cannot be too narrow (e.g., in terms of full width at half maximum (FWHM)), because there may be insufficient resolution for some applications. Windows $640_1$-$640_4$ represent portions of Raman signals 630A and 630B which pass through (constituent filters of) filter 270. Window $640_1$ is centered about wavelength $\lambda_1$, window $640_2$ about wavelength $\lambda_2$, window $640_3$ about wavelength $\lambda_3$, and window $640_4$ about wavelength $\lambda_4$. Although four windows $640_1$-$640_4$ are shown in FIGS. 6A and 6B, any number of windows (corresponding to the number of constituent filters of filter 270) can be used. As shown in FIGS. 6A and 6B, windows $640_1$-$640_4$ may not cover all of Raman signals 630A and 630B (e.g., the resolution is low).

To compensate for the low resolution, the excitation wavelength of excitation light source 220 (FIG. 2) can be tuned. When the excitation wavelength is shifted by step Δλ (which can be referred to as a walking step), the spectrum (Raman signals 630A and 630B) will follow the laser shift. The whole Raman spectrum shifts by the same amount as the laser wavelength shift/step. In addition, the Raman spectrum remains the same (just shifted), regardless of the excitation wavelength. That is, the same molecules in analyte 240 are measured with each laser pulse (e.g., light 230 in FIG. 2), so the Raman spectrum is the same (just shifted) with each laser pulse.

FIG. 6A shows an initial measurement (Raman spectrum) and FIG. 6B shows a subsequent measurement (Raman spectrum)—shifted by step Δλ—taken after excitation light source 220 is shifted by step Δλ. With each step Δλ, windows $640_1$-$640_4$ cover a portion of the spectrum not covered by the preceding step(s). By shifting the excitation wavelength of excitation light source 220, the spectrum (e.g., Raman signals 630A and 630B) is shifted. By shifting (multiple times), the spectrum can be fully covered by windows $640_1$-$640_4$. Since step Δλ is predetermined to cover the spectrum (Raman signals 630A and 630B), the spectrum can be constructed (stitched together) from the measurements (e.g., fraction of the spectrum) taken each time excitation light source 220 is shifted by step Δλ.

The size of Δλ (e.g., how far (range of) excitation light source 220 (FIG. 2) is tuned), number of constituent filters in filter 270 (FIG. 2) and hence the number of windows, and the width (e.g., in terms of FWHM) of the filters can be traded off amongst each other. An excitation light source tunable over a large range requires a larger laser. A larger array size (number of constituent filters) for filter 270 reduces the number of steps that are taken. Narrower constituent filters of filter 270 can reduce the size of step Δλ and the filter array size. Purely for the purpose of illustration and not limitation, Table 1 shows the number of filters, the number of steps, and the step size (Δλ), where the constituent filters (e.g., of filter 270 in FIG. 2) have a FWHM bandwidth in a range from approximately 0.1 nm to 0.7 nm:

TABLE 1

| NUMBER OF FILTERS | NUMBER OF STEPS | STEP SIZE (Δλ) (nm) |
|---|---|---|
| 4 | 24 | 0.1 |
| 8 | 24 | 0.2 |
| 16 | 20 | 0.4 |
| 32 | 20 | 0.4 |
| 64 | 16 | 0.4 |
| 128 | 8 | 0.4 |
| 256 | 4 | 0.5 |
| 512 | 2 | 0.6 |
| 1024 | 2 | 0.6 |
| 2048 | 1 | 0.7 |

FIGS. 7A and 7B illustrate code 700A and 700B for calculating a number of filters, a number of steps, and a step size, such as are shown above in Table 1. For example, to cover a range of Raman shift from 300 $cm^{-1}$ to 1800 $cm^{-1}$ wavenumber, using a 980 nm excitation pulse and a filter having a FWHM bandwidth of 2 nm, the number of filters can be determined with the number of the laser wavelength steps tuned (wavelength interval), which can be similar to the filter bandwidth. If 4 steps (of tuned laser wavelengths) are used, then the wavelength separation of the filter can be every 2×4=8 nm. Code 700A and 700B can be used to study, for example, the tradeoff between a number of filters and a number of steps, and determine suitable combinations for different applications.

Figure 8:
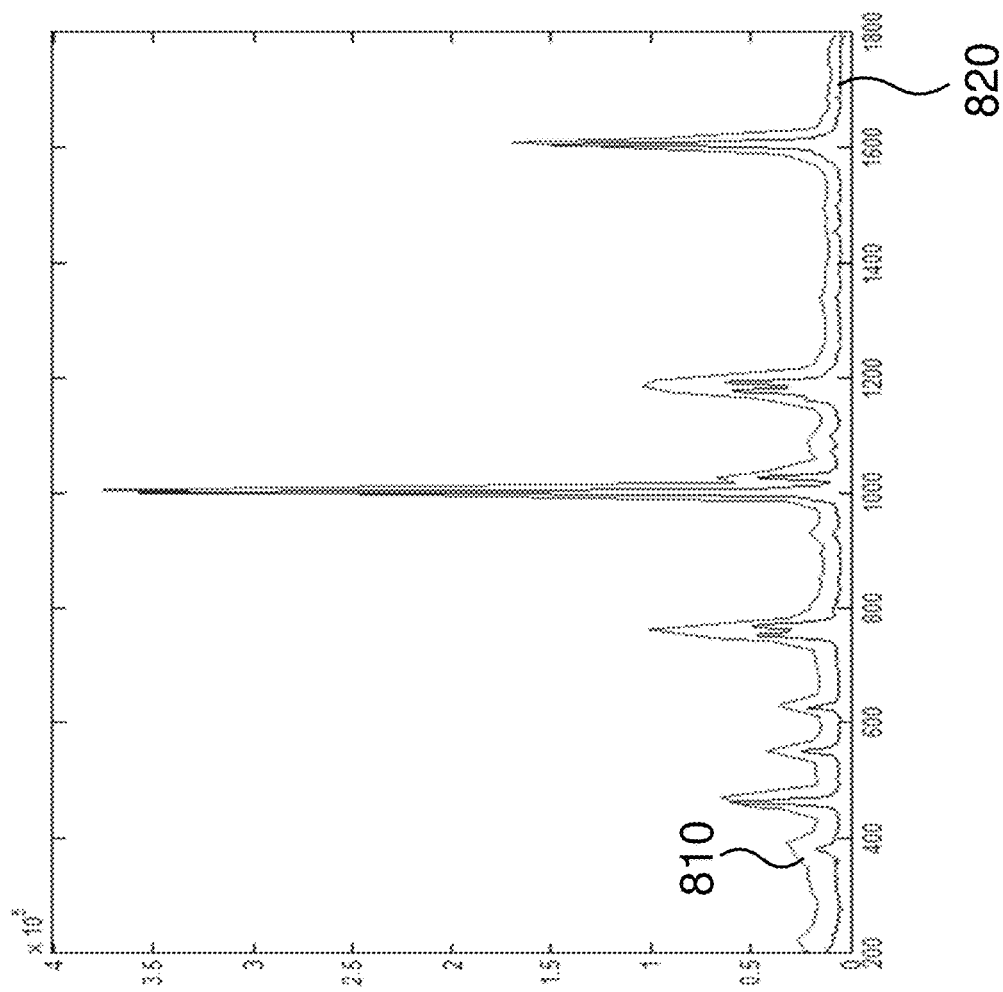
FIG. 8 is a graph of a simulated and an actual Raman spectrograph.

In some embodiments, the spectrometer resolution (e.g., spectrometer 210 in FIG. 2) is equal to or slightly worse than the filter (e.g., filter 270) bandwidth. FIG. 8 illustrates a graphical representation (e.g., plot, graph, and the like) 800 of simulated Raman spectrum 810 and actual Raman spectrum 820 for Benzonitrile ($C_7H_5N$ or $C_6H_5(CN)$). In the example of FIG. 8, simulated Benzonitrile spectra 810—from a 980 nm excitation pulse, filter size of 2 nm, and four tuned laser steps of 980 nm, 982 nm, 984 nm, and 986 nm—is shown with actual Benzonitrile spectra 820. The spectral resolution of simulated Benzonitrile spectra 810 is around 19 $cm^{-1}$, which is slightly worse, but very close to 2 nm. The total wavelength range in nm for 300 $cm^{-1}$ 1800 $cm^{-1}$ can be ~181 nm, thus the total number of narrowband filters should be 181÷8=22.5, thus at least 23 filters can be used.

Figure 9:
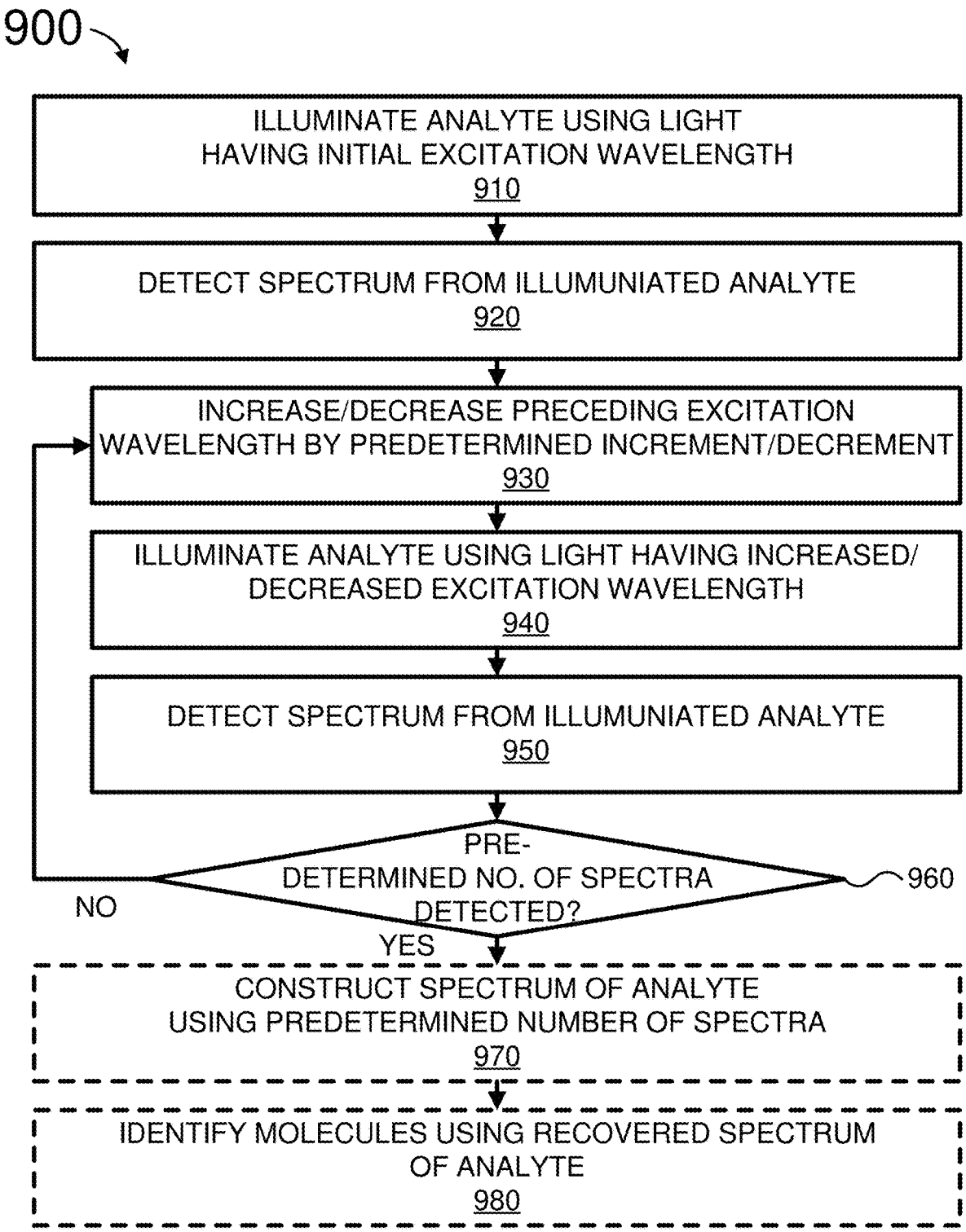
FIG. 9 illustrates a flow diagram of a method for spectroscopy using a filtered sensor, according to some embodiments.

FIG. 9 illustrates a method 900 for spectroscopy using a filtered sensor, according to some embodiments. Method 900 can be performed by spectrometer 210 and 210A (FIGS. 2 and 4) and/or computing system 295 (FIG. 2). Method 900 can commence at step 910, where an analyte can be illuminated using light having an initial excitation wavelength. For example, the analyte has at least some of the characteristics analyte 240 and 240A (FIGS. 2 and 4). By way of further non-limiting example, the light can be provided by spectrometer 210 and/or 210A, for example, using excitation light source 220 (FIG. 2). For illustrative purposes, the initial excitation wavelength can referred to as $\lambda_0$ and can have a value of 670 nm (e.g., $\lambda_0$=670 nm). Other values for $\lambda_0$ can be used.

At step 920, a spectrum (e.g., including Raman scattering (or Raman signal)) can be detected from the illuminated analyte. In some embodiments, the light hitting the analyte results in Raman scattering (or Raman signal). For example, the Raman scattering (e.g., light 250 and 250A in FIGS. 2 and 4, respectively) can be detected by spectrometer 210 and 210A (e.g., using detector 280 through filter 270 (FIG. 2)). By way of further non-limiting example, the detected Raman scattering may appear (e.g., when graphed, plotted, and the like) in/through windows $640_1$-$640_4$, as shown in graph 600A (FIG. 6A) (where the excitation wavelength is $\lambda_0$). The detected spectrum (e.g., data, graphical representation, and the like) can be stored by and/or in spectrometer 210 and 210A, and/or computing system 295.

At step 930, the preceding excitation wavelength can be increased or decreased by a predetermined increment or decrement, respectively. For illustrative purposes, the predetermined increment/decrement can be referred to as Δλ. For example, when the preceding excitation wavelength is $\lambda_0$, an increased/decreased excitation wavelength is $\lambda_1$, where $\lambda_1=\lambda_0\pm\Delta\lambda$. The detected Raman scattering may appear (e.g., when graphed, plotted, and the like) in/through windows $640_1$-$640_4$, as shown in graph 600B (FIG. 6B) (where the excitation wavelength is $\lambda_1$). By way of further non-limiting example, when the preceding excitation wavelength is $\lambda_1$, an increased/decreased excitation wavelength is $\lambda_2$, where $\lambda_2=\lambda_1\pm\Delta\lambda$. By way of additional non-limiting example, when N spectra are to be detected, $\lambda_A=\lambda_0\pm(A*\Delta\lambda)$, where A={0, 1, . . . (N−1)}.

By way of illustration and not limitation, the predetermined increment/decrement can have a value of 0.5 nm. To illustrate embodiments where the excitation wavelength is increased, when $\lambda_0$=670 nm, $\lambda_1$=670.5 nm, $\lambda_2$=671 nm, and so on according to the number of spectra to be detected (N). In some embodiments, the excitation wavelength is decreased by a decrement.

At step 940, the analyte can be illuminated using light having the increased or decreased wavelength. To illustrate embodiments where the excitation wavelength is increased, the light can have a wavelength λ1=670.5 nm, λ2=671 nm, or so on according to the number of spectra to be detected (N).

At step 950, a spectrum (e.g., including Raman scattering (or Raman signal)) can be detected from the illuminated analyte. In some embodiments, the light (having the increased/decreased excitation wavelength) hitting the analyte results in Raman scattering (or Raman signal) and fluorescence. For example, the Raman scattering can be detected by spectrometer 210 and 210A (FIGS. 2 and 4) (e.g., using detector 280 through filter 270 (FIG. 2)). The detected Raman scattering may appear (e.g., when graphed/plotted) as shown in graph 600B (FIG. 6B) (where the excitation wavelength is the excitation wavelength increased/decreased by $\Delta\lambda$, for example, $\Delta_1$. Each detected spectrum (e.g., data, graphical representation, and the like) can be stored by (and/or in) spectrometer 210 and 210A and/or computing system 295.

At step 960, a determination is made as to whether another spectrum is to be detected. In some embodiments, the predetermined number of spectra to be detected (N) is compared to the number of spectra (actually) detected. When the predetermined number of spectra to be detected (N) is less than the number of spectra detected, method 900 can proceed to step 930. When the predetermined number of spectra to be detected (N) is equal to the number of spectra actually detected, method 900 can proceed to step 970. For example, when N=6 and spectra are already detected for $\lambda_0$, $\lambda_1$, $\lambda_2$, $\lambda_3$, $\lambda_4$, and $\lambda_5$, method 900 can proceed to step 970. By way of further non-limiting example, when N=3 the detected Raman scattering and fluorescence (e.g., detected for each of $\lambda_0$, $\lambda_1$, and $\lambda_2$) may appear (e.g., when graphed/plotted together) as shown in graphs 600A and/or 600B (FIGS. 6A and 6B).

Optionally at step 970, a Raman spectrum of the analyte can be recovered using the detected spectra (e.g., N detected spectra). The recovered Raman spectrum may appear (e.g., when graphed/plotted) as shown in graphs 600A and 600B (FIGS. 6A and 6B) (e.g., Raman signal 630A and/or 630B). Optionally at step 980, a molecule can be identified using the recovered Raman spectrum. For example, a database of known Raman spectrum for certain molecules can be searched using (e.g., compared to) the recovered Raman spectrum to find a match.

Non-limiting examples of molecules that can be detected at step 980 are provided in Table 2.

TABLE 2

| MOLECULE | DIAGNOSTIC FOR |
|---|---|
| Carotenoid | Antioxidant levels |
| Glucose | Diabetes Daily Monitoring |
| Glucose (HbA1c test) | Diabetes |
| Colon cancer biomarker (BM) | Cancer |
| Liver cancer BM | Cancer |
| Lung cancer BM | Cancer |
| Melanoma BM | Cancer |
| Stomach cancer BM | Cancer |
| HDL Cholesterol | Heart Disease |
| LDL Cholesterol | Heart Disease |
| Triglycerides | Heart Disease |

Figure 10:
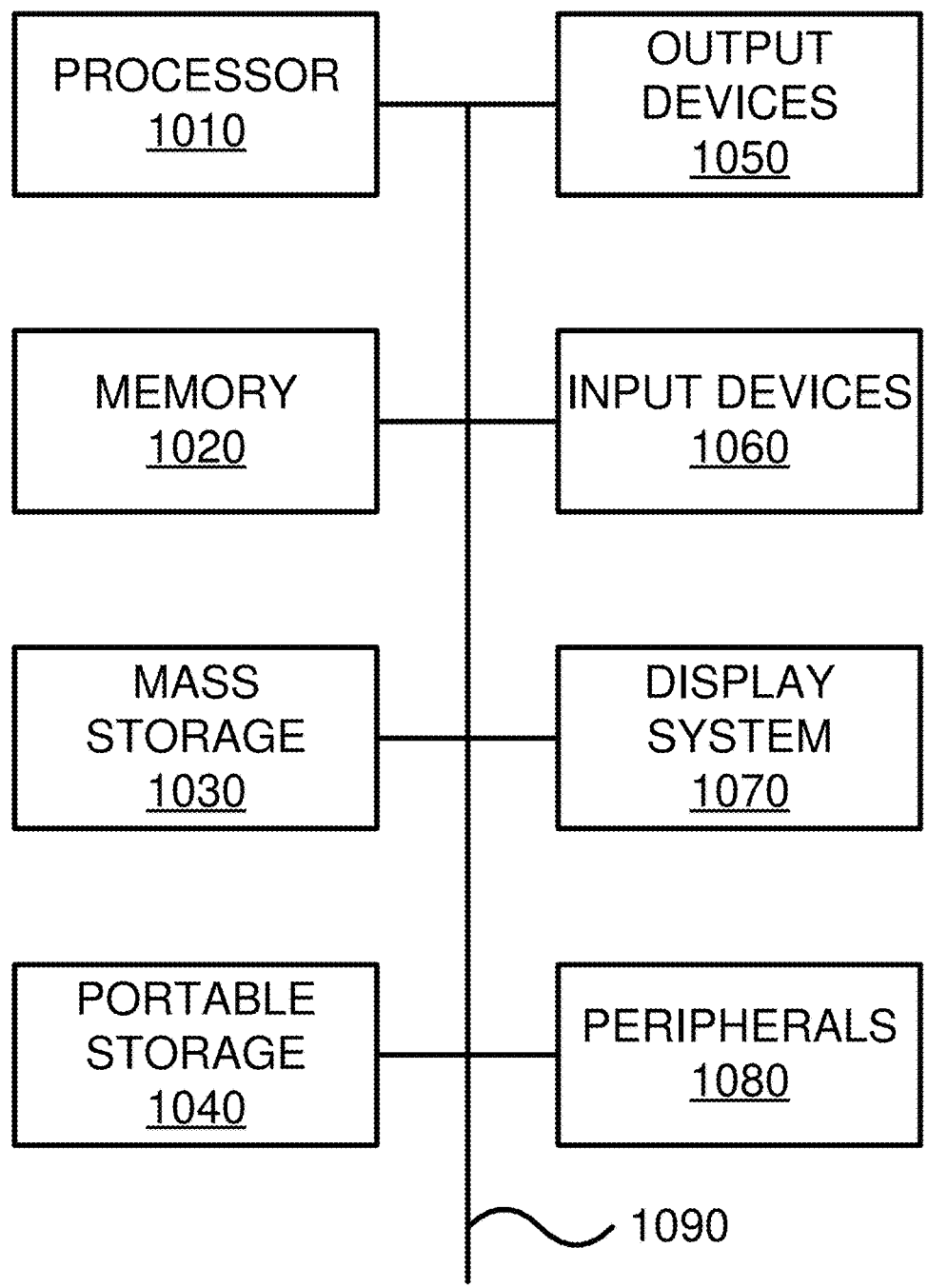
FIG. 10 is a simplified block diagram of a computing system, according to various embodiments.

FIG. 10 illustrates an exemplary computer system 1000 that may be used to implement some embodiments of the present invention. The computer system 1000 in FIG. 10 may be implemented in the contexts of the likes of computing systems, networks, servers, or combinations thereof. The computer system 1000 in FIG. 10 includes one or more processor unit(s) 1010 and main memory 1020. Main memory 1020 stores, in part, instructions and data for execution by processor unit(s) 1010. Main memory 1020 stores the executable code when in operation, in this example. The computer system 1000 in FIG. 10 further includes a mass data storage 1030, portable storage device 1040, output devices 1050, user input devices 1060, a graphics display system 1070, and peripheral device(s) 1080.

The components shown in FIG. 10 are depicted as being connected via a single bus 1090. The components may be connected through one or more data transport means. Processor unit(s) 1010 and main memory 1020 are connected via a local microprocessor bus, and the mass data storage 1030, peripheral device(s) 1080, portable storage device 1040, and graphics display system 1070 are connected via one or more input/output (I/O) buses.

Mass data storage 1030, which can be implemented with a magnetic disk drive, solid state drive, or an optical disk drive, is a non-volatile storage device for storing data and instructions for use by processor unit(s) 1010. Mass data storage 1030 stores the system software for implementing embodiments of the present disclosure for purposes of loading that software into main memory 1020.

Portable storage device 1040 operates in conjunction with a portable non-volatile storage medium, such as a flash drive, floppy disk, compact disk, digital video disc, or Universal Serial Bus (USB) storage device, to input and output data and code to and from the computer system 1000 in FIG. 10. The system software for implementing embodiments of the present disclosure is stored on such a portable medium and input to the computer system 1000 via the portable storage device 1040.

User input devices 1060 can provide a portion of a user interface. User input devices 1060 may include one or more microphones, an alphanumeric keypad, such as a keyboard, for inputting alphanumeric and other information, or a pointing device, such as a mouse, a trackball, stylus, or cursor direction keys. User input devices 1060 can also include a touchscreen. Additionally, the computer system 1000 as shown in FIG. 10 includes output devices 1050. Suitable output devices 1050 include speakers, printers, network interfaces, and monitors.

Graphics display system 1070 include a liquid crystal display (LCD) or other suitable display device. Graphics display system 1070 is configurable to receive textual and graphical information and processes the information for output to the display device.

Peripheral device(s) 1080 may include any type of computer support device to add additional functionality to the computer system.

The components provided in the computer system 1000 in FIG. 10 are those typically found in computer systems that may be suitable for use with embodiments of the present disclosure and are intended to represent a broad category of such computer components that are well known in the art. Thus, the computer system 1000 in FIG. 10 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX, ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 1000 may be implemented as a cloud-based computing environment, such as a virtual machine operating within a computing cloud. In other embodiments, the computing system 1000 may itself include a cloud-based computing environment, where the functionalities of the computing system 1000 are executed in a distributed fashion. Thus, the computing system 1000, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 1000, with each server (or at least a plurality thereof) providing processor and/or storage resources.

These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical, magnetic, and solid-state disks, such as a fixed disk. Volatile media include dynamic memory, such as system random-access memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Python, JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of wired and/or wireless network, including a (wireless) local area network (LAN/WLAN) or a (wireless) wide area network (WAN/WWAN), or the connection may be made to an external computer (for example, through the Internet using an Internet Service Provider, wireless Internet provider, and the like).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated. The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A method for spectroscopy comprising:
    illuminating, with a tunable laser, an analyte with a first light, the first light having a first excitation wavelength;
    detecting, with a filtered sensor, a first Raman signal, the filtered sensor being a single photon avalanche diode array detector;
    illuminating, with the tunable laser, the analyte using a second light, the second light having a second excitation wavelength, the second excitation wavelength being larger than the first excitation wavelength by a first predetermined increment;
    detecting, with the filtered sensor, a second Raman signal, the second Raman signal being shifted from the first Raman signal by a second predetermined increment;
    illuminating, with the tunable laser, the analyte using a third light, the third light having a third excitation wavelength, the third excitation wavelength being larger than the second excitation wavelength by the first predetermined increment;
    detecting, with the filtered sensor, a third Raman signal, the third Raman signal being shifted from the second Raman signal by the second predetermined increment, wherein the first Raman signal, the second Raman signal, and the third Raman signal are directly passed by a beam splitter from the analyte to the filtered sensor;

constructing a Raman spectrum, with a computing system, using the first Raman signal, the second Raman signal, and the third Raman signal; and determining at least one molecule of the analyte, with the computing system, using the Raman spectrum and a database of predetermined Raman spectra.

2. The method of claim 1, wherein the filtered sensor comprises a complementary metal oxide semiconductor (CMOS) charge-coupled device (CCD) having a filter disposed thereon.

3. The method of claim 2, wherein the CMOS CCD is back illuminated.

4. The method of claim 2, wherein the filter is at least one of a thin-film coating, glass, and plastic.

5. The method of claim 2, wherein the first excitation wavelength, the second excitation wavelength, and the third excitation wavelength are each within a range from 650 nm to 950 nm.

6. The method of claim 1, wherein the filter comprises a plurality of sub-filters, at least some of the plurality of sub-filters transmitting light at different wavelength ranges, the plurality of sub-filters being arranged in at least one of a one-dimensional array and a two-dimensional array on the sensor.

7. The method of claim 1, wherein the tunable laser is at least one of temperature controlled and in a transistor outline (TO) package.

8. The method of claim 1, wherein the analyte is at least one of living plant tissue, animal tissue, and a human limb.

9. The method of claim 1, wherein the illuminating the analyte using the first light, the detecting the first Raman signal, the illuminating the analyte using the second light, the detecting the second Raman signal, the illuminating the analyte using third light, and the detecting the third Raman signal are collectively performed in 25 seconds or less.

10. The method of claim 1, wherein the at least one molecule is one or more of blood sugar, cholesterol, and a cancer biomarker.

11. A system for spectroscopy comprising:
a processor; and
a memory communicatively coupled to the processor, the memory storing instructions executable by the processor to perform a method, the method comprising:
illuminating, with a tunable laser, an analyte with a first light, the first light having a first excitation wavelength;
detecting, with a filtered sensor, a first Raman signal, the filtered sensor being a single photon avalanche diode array detector;
illuminating, with the tunable laser, the analyte using a second light, the second light having a second excitation wavelength, the second excitation wavelength being larger than the first excitation wavelength by a first predetermined increment;
detecting, with the filtered sensor, a second Raman signal, the second Raman signal being shifted from the first Raman signal by a second predetermined increment;
illuminating, with the tunable laser, the analyte using a third light, the third light having a third excitation wavelength, the third excitation wavelength being larger than the second excitation wavelength by the first predetermined increment;
detecting, with the filtered sensor, a third Raman signal, the third Raman signal being shifted from the second Raman signal by the second predetermined increment, wherein the first Raman signal, the second Raman signal, and the third Raman signal are directly passed by a beam splitter from the analyte to the filtered sensor;
constructing a Raman spectrum using the first Raman signal, the second Raman signal, and the third Raman signal; and
determining at least one molecule of the analyte using the Raman spectrum and a database of predetermined Raman spectra.

12. The system of claim 11, wherein the filtered sensor comprises a complementary metal oxide semiconductor (CMOS) charge-coupled device (CCD) having a filter disposed thereon.

13. The system of claim 12, wherein the CMOS CCD is back illuminated.

14. The system of claim 12, wherein the filter is at least one of a thin-film coating, glass, and plastic.

15. The system of claim 12, wherein the first excitation wavelength, the second excitation wavelength, and the third excitation wavelength are each within a range from 650 nm to 950 nm.

16. The system of claim 11, wherein the filter comprises a plurality of sub-filters, at least some of the plurality of sub-filters transmitting light at different wavelength ranges, the plurality of sub-filters being arranged in at least one of a one-dimensional array and a two-dimensional array on the sensor.

17. The system of claim 11, wherein the tunable laser is at least one of temperature controlled and in a transistor outline (TO) package.

18. The system of claim 11, wherein:
the analyte is at least one of living plant tissue, animal tissue, and a human limb; and
the at least one molecule is one or more of blood sugar, cholesterol, and a cancer biomarker.

19. The system of claim 11, wherein the illuminating the analyte using the first light, the detecting the first Raman signal, the illuminating the analyte using the second light, the detecting the second Raman signal, the illuminating the analyte using third light, and the detecting the third Raman signal are collectively performed in 25 seconds or less.

20. A system for spectroscopy comprising:
means for illuminating an analyte with a first light, the first light having a first excitation wavelength;
means for detecting a first Raman signal, a filtered sensor being a single photon avalanche diode array detector;
means for illuminating the analyte using a second light, the second light having a second excitation wavelength, the second excitation wavelength being larger than the first excitation wavelength by a first predetermined increment;
means for detecting a second Raman signal, the second Raman signal being shifted from the first Raman signal by a second predetermined increment;
means for illuminating the analyte using a third light, the third light having a third excitation wavelength, the third excitation wavelength being larger than the second excitation wavelength by the first predetermined increment;
means for detecting a third Raman signal, the third Raman signal being shifted from the second Raman signal by the second predetermined increment, wherein the first Raman signal, the second Raman signal, and the third Raman signal are directly passed by a beam splitter from the analyte to the filtered sensor;

means for constructing a Raman spectrum using the first Raman signal, the second Raman signal, and the third Raman signal; and means for determining at least one molecule of the analyte using the Raman spectrum and a database of predetermined Raman spectra.

* * * * *